L. K. TUTTLE.
POWER TRANSMISSION BELTING.
APPLICATION FILED SEPT. 19, 1912.
1,048,236.
Patented Dec. 24, 1912.
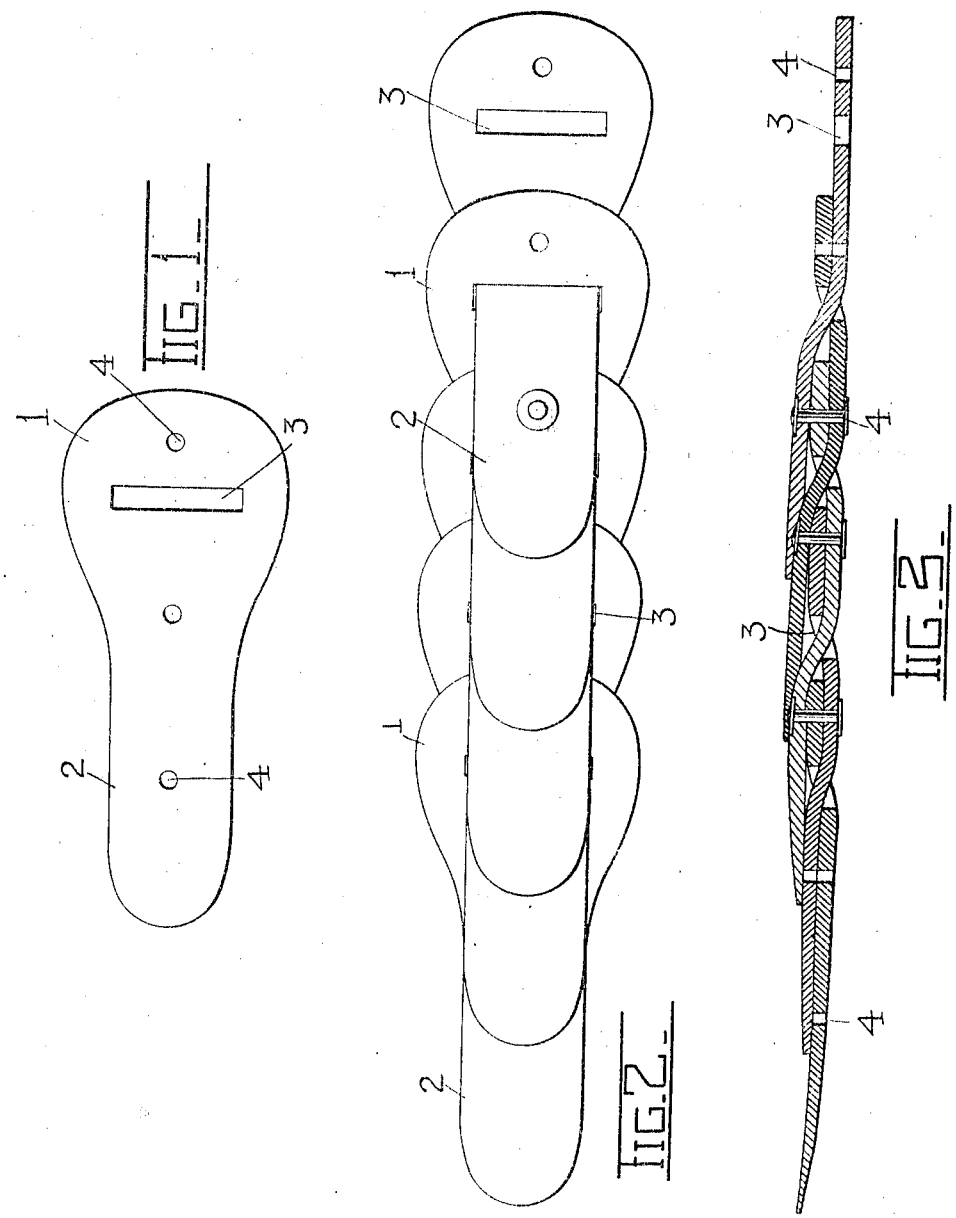

UNITED STATES PATENT OFFICE.

LOUIS K. TUTTLE, OF OKLAHOMA, OKLAHOMA.

POWER-TRANSMISSION BELTING.

1,048,236.  Specification of Letters Patent.  Patented Dec. 24, 1912.

Application filed September 19, 1912. Serial No. 721,187.

*To all whom it may concern:*

Be it known that I, LOUIS K. TUTTLE, a citizen of the United States, residing at Oklahoma city, in the county of Oklahoma and State of Oklahoma, have invented certain new and useful Improvements in Power-Transmission Belting, of which the following is a specification.

My improvement relates to power transmission belting and more particularly to a type of power transmission belting made of a plurality of interlaced parts.

The object is to provide a simple, cheap, strong and efficient form of belting wherein small pieces known as scrap may be utilized.

A further object is to provide a power transmission belt that due to its novel construction will have considerably more "grip" on the periphery of the power and driven elements than the old form of smooth belting. The securing rivets on my form of belting are only visible from one side when the elements are assembled.

Such other advantages relative to adjustment, strength, and the easy manner of a repair are obvious in my improvement.

In the drawings I have shown a narrow form of belting such as may be used on motor cycles or the like, but I shall expect to alter the size and proportion of the parts and also to make such other mechanical changes in construction, material used, etc., as do not depart from the spirit of the improvement as set forth in the annexed claims.

The manufacture of my form of belting will be very cheap the parts being stamped by blanking dies from "scrap" leather or other material, the parts being riveted together into chains of standard lengths. A plurality of lengths may be quickly and simply riveted together by hand if an unusual length is required, or repairs may be rapidly made by the insertion of the required number of elements and the driving of several copper rivets.

In the drawings: Figure 1 represents a plan view of a single element as stamped by a blanking die from a piece of leather or other material. Fig. 2 is a plan view of several of the elements joined. Fig. 3 is a sectional elevation through the center of several of the elements.

The general form of the elements as stamped from the scrap stock is pear shaped having an enlarged body portion 1 and a reduced tongue portion 2 a rectangular opening 3 being provided in the enlarged body portion of sufficient size to take the reduced tongue portion 2, rivet holes 4 being distributed as shown along the center line of the element, the exact longitudinal location of which depending upon the exact shape of the element, the idea being when the several elements are assembled and the corresponding rivet holes register the reduced tongue portion will be fully inserted in the rectangular opening of the adjoining element and the extreme end of the tongue covering the last rivet in the tongue directly under.

Having thus described my improvement I claim—

1. A power belting comprising a plurality of interwoven, flat, substantially pear-shaped elements having enlarged body portions and reduced tongue portions, rectangular openings in the said enlarged body portions adapted to receive the reduced tongue portion, and securing rivet holes in the reduced tongue portion and in the body portion.

2. A two ply power belting comprising a plurality of interwoven flat pear-shaped elements, having enlarged body portions and reduced tongue portions, transverse rectangular openings in the enlarged body portions adapted to receive the reduced tongue portion, and securing rivet holes in the reduced tongue portion and in the enlarged body portion, the said holes being visible from one side only when the elements are assembled.

In testimony whereof I affix my signature in presence of two witnesses.

LOUIS K. TUTTLE.

Witnesses:
FRANK TUTTLE,
J. L. WOODY.